United States Patent [19]

Turnberg

[11] Patent Number: 4,995,788

[45] Date of Patent: Feb. 26, 1991

[54] COMPOSITE ROTOR BLADE

[75] Inventor: Jay E. Turnberg, Longmeadow, Mass.

[73] Assignee: United Technologies Corporation, Hartford, Conn.

[21] Appl. No.: 404,545

[22] Filed: Sep. 8, 1989

[51] Int. Cl.$^5$ .............................................. F01D 5/14
[52] U.S. Cl. .............................. 416/230; 416/229 A; 416/248
[58] Field of Search ........... 416/219 R, 220 R, 230 R, 416/241 A, 248, 229 R, 229 A

[56] References Cited

U.S. PATENT DOCUMENTS

| | | | |
|---|---|---|---|
| 2,644,537 | 7/1953 | Meyers | 416/226 |
| 2,873,088 | 2/1959 | Neumann | 253/77 |
| 3,487,879 | 1/1970 | McCarthy et al. | 416/220 |
| 3,694,104 | 9/1972 | Erwin | 416/241 A |
| 3,799,701 | 3/1974 | Rothman | 416/226 |
| 3,883,267 | 5/1975 | Baudier et al. | 416/230 |
| 4,037,990 | 7/1977 | Harris | 416/220 R |
| 4,040,770 | 8/1977 | Carlson | 416/248 |
| 4,417,854 | 11/1983 | Cain et al. | 416/248 |
| 4,784,575 | 11/1988 | Nelson | 416/226 |

FOREIGN PATENT DOCUMENTS

| | | | |
|---|---|---|---|
| 1073330 | 9/1954 | France | 416/230 |
| 1260484 | 1/1972 | United Kingdom | 416/241 A |

Primary Examiner—Edward K. Look
Assistant Examiner—Hoang Nguyen
Attorney, Agent, or Firm—Marshall E. Rosenberg

[57] ABSTRACT

A composite rotor blade (2) with airfoil surfaces (4) used in rotary machines and a method for making the rotor blade (2) are disclosed. The rotor blade (2) includes a spar (8) with a root (12) which incorporates chordwise distributed recesses (13) which capture the composite laminate (16) which forms external airfoil surfaces (4). The root recesses (13) are sized so as to capture the volumetric bulk of the composite laminate (16) below the loadbearing surfaces (21) of the root (12) which fits into a complementary shaped recess (7) located within the rotatable hub (14). The method includes the steps of forming a composite rotor blade (2).

13 Claims, 1 Drawing Sheet

COMPOSITE ROTOR BLADE

DESCRIPTION

1. Field of the Invention

This invention relates to composite rotor blades used in rotary machines.

2. Background of the Invention

Rotary machines contain rotor blades or propellers installed in rotatable hubs or disks in radial orientation. These rotor assemblies typically contain a plurality of aerodynamically shaped blades, or airfoils, which operate at high speeds and in hostile environments. As a result, these rotor blades or propellers are subjected to internally and externally generated stresses. Properly designed rotor blades or propellers can accommodate most known stresses, resulting in the long and safe operation of the rotary machine.

Stressing primarily occurs through centrifugal loading, steady and vibrational aerodynamic loading, and temperature gradients within the blade. An important source of stress in rotating parts is centrifugal force. In a rotary machine, the cross-sectional area of the rotor blade must restrain the centrifugal force on all of the material beyond its own radial location in relation to the machine's axis of rotation. The rotatable hub or disk to which a rotor blade or propeller is attached therefore experiences centrifugal force and must be designed accordingly.

Other sources of stress can also affect the mechanical properties of a rotor blade, and are known in the art. These sources include, but are not limited to, contact with foreign objects, shock, vibration, abrasion between mating components, and stress concentrations intrinsic to rotor blade geometry.

Relatively recent developments in blade design has resulted in the replacement of all-metal blades with composite blades useful for many applications. Composite rotor or propeller blades typically are constructed of composite laminates wrapped about a centrally located spar. The spar is typically composed of a high-modulus material, such as aluminum, steel, or titanium, and its shape is defined by the finished blade's desired aerodynamic shape and loading. Composite laminates typically consist of directionally oriented high strength filaments immersed in resinous matrices. These laminates offer a number of benefits, including enhanced tensile loading capabilities when properly secured to the centrally located spar, and orientation of the laminate to produce optimal strength to weight characteristics.

An important problem with composite blades is retention of a blade's composite laminations to its centrally located spar when the blade is subjected to the operational and adverse stressing conditions described above.

Overstressing and wear generally occurs when stresses concentrate in the vicinity of the attachment of the blade to the hub, resulting in damage and weakening of the composite laminate which is wrapped around the radially inward end of the blade and which is in direct contact with the rotatable hub. Abrasion of the laminate, also known as fretting, can occur in the vicinity of the blade-hub attachment as described above. Abrasion of composite laminate results in weakening of the blade's loadbearing capability.

The related art generally teaches the use of a shaped blade base, such as a fir tree or dovetail shape, to securely capture the blade in a complementary recess in the rotor hub. The related art also teaches the wrapping of laminates about shaped blade bases. However, composite blades constructed in this manner have at least two major operational problems. The first problem is the laminate's vulnerability to abrasion due to its direct contact with the blade base's complementary recesses within the rotor hub. An area particularly susceptible to abrasion is located in the immediate vicinity of the blade base plane, which is herein defined as the plane tangent to the outer diameter of the rotor hub passing through the complementary recess in which the blade root is captured. The second is the well known fact that kinks and discontinuities in the laminate, which occur as a result of laminate layup over a discontinuous surface, will severely impact on a composite's service life.

SUMMARY OF THE INVENTION

It is thus a general object of the present invention to provide a new design for a composite rotor blade that eliminates abrasion between the fibrous composite laminate that is wrapped about a spar root, which provides the foundation for a composite blade, and the rotor hub in which the composite blade's root is captured while providing a mechanical joint between the fibrous composite laminate and the spar root.

It is yet another object of the present invention to utilize such an abrasion-eliminating design in combination with a proven blade retention configuration.

It is a further object of the present invention to provide metal-to-metal contact between a spar root and the rotor hub in which the spar root is captured.

These and other objects will become apparent in the further course of this disclosure.

The present invention provides a design for a composite blade which eliminates abrading contact between the rotor blade's composite material and the hub in which the rotor blade's root is contained. This is accomplished through the use of sub-surface recesses disposed in the root end of a central spar about which a composite blade is constructed. These recesses capture and recess the composite material away from the loadbearing surfaces of the blade root and a complementary shaped recess located within a rotor hub.

This invention provides significant advantages over the related art. Composite materials placed within the sub-surface recesses are not subjected to abrading stresses which can significantly reduce service life, and the radial strength properties contributed by the composite material are fully preserved. Furthermore, the captured composite materials are mechanically restrained by the sub-surface recesses, thereby providing a redundant mechanical joint. Finally, this invention provides a blade retention configuration which is well known and widely used in the art.

DETAILED DISCLOSURE

Figure 1:
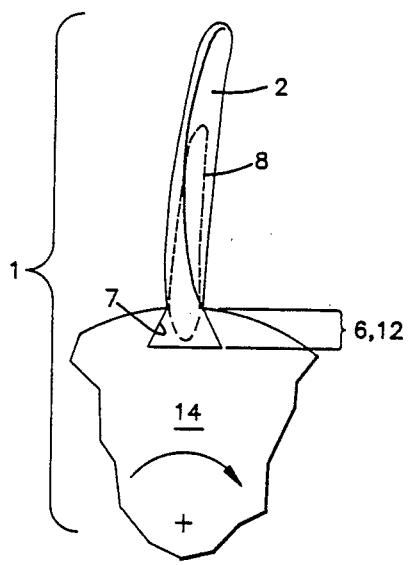
FIG. 1 illustrates the arrangement of a composite rotor blade in relation to its complementary shaped recess within a rotor hub, according to the present invention.

FIG. 1 diagrammatically represents a rotor assembly 1 comprising an aerodynamically shaped composite rotor blade 2 with a blade root 6 which is captured by a complementary shaped recess 7 within a rotor hub 14. The complementary shaped recess 7 retains the blade 2 in a radial orientation during rotational operation. Typically, a plurality of blades 2 extend radially from the rotor hub 14, but only one such blade 2 is shown here for clarity.

Figure 2:
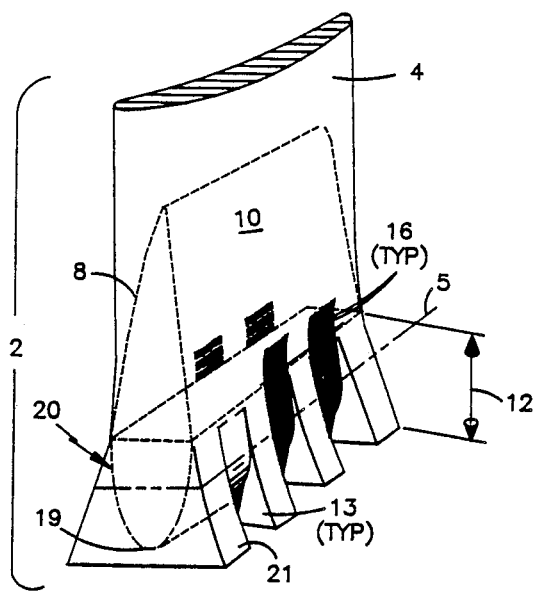
FIG. 2 is a detailed view of the composite rotor blade, illustrating the arrangement of the sub-surface recesses within the blade's internally-located spar.

FIG. 2 refers to a more detailed view of the rotor blade 2 according to the present invention. A centrally located spar 8, typically composed of a high-modulus material such as aluminum, steel, or titanium, forms the foundation of the composite blade 2. This spar 8 includes a spar root 12 and a plurality of radially outward extending surfaces 10. The spar 8 has three important features. First, the spar 8 includes a spar root 12 designed to mate with a complementary shaped recess 7 within a rotatable hub as described above.

Second, the spar root 12 features a plurality of chordwisely spaced recesses 13 with respect to rotor blade 2. These recesses 13 are adapted to receive the composite material 16 from which the composite blade 2 is crafted. The recesses 13 extend spanwisely toward the base of the spar root 12 from the blade base plane 5 on both sides of the spar root 12, meeting at a sub-surface depth within the spar root 12. The recesses 13 originate at the spar surfaces 10 and extend spanwisely radially inward to meet a corresponding recess 13 at a radially inward position 19. The blade base plane 5 for a given blade is the plane tangent to the outer diameter of the rotor hub 14 passing through the complementary recess 7 in which the spar root 12 is captured. The radially inner surfaces of the recesses 13 form an arcuate shape 20 when viewed in cross-section through the spar's root structure. These recesses 13 provide smooth arcuate surfaces, devoid of sharp edges and discontinuities, on which composite laminate material 16 is layed.

Third, the spar 8 provides radially outward extending surfaces 10 above the blade base plane 5 for supporting the composite laminate 16 and the airfoil surface 4.

The composite blade 2 is constructed by initially laying composite laminate 16 on the spar 8 at a surface 10 in a spanwise direction from above the blade base plane 5 downward toward the spar root 12. The directionality of the composite laminate's fibers may be determined as is widely known and practiced by those skilled in the art. The composite laminate 16 is then guided through the spaced recesses 13 located within the spar root 12. The composite laminate 16 is then wrapped essentially 180 degrees around these arcuated recesses 13 located at the base of the spar root 12, the composite laminate 16 then routed back in a spanwise fashion to a surface 10 on the spar 8 above the blade base plane 5. This composite laminate 16 is then compressed and cured according to the current art. The composite blade 2 thus provides a mechanical joint between the composite laminate 16 and the spar root 12, whereby the composite laminate 16, as wrapped about the radially inward arcuate surfaces 20 of the spar root 12, opposes centrifugal and other stresses, as previously discussed in detail.

The depths and chordwise widths of the recesses 13 are calculated in terms of such design parameters as blade strength, rigidity, and flexure, among others, as well as in terms of accommodation of the resulting volumetric bulk of the composite laminate 16. Calculations of the depths and chordwise widths of the recesses 13 must allow for full containment of the composite laminate 16 below the loadbearing surfaces 21 of the spar root 12 so as to prevent abrasion between the composite laminate 16 and the complementary shaped recess 7. For a metallic hub 14 and a metallic spar 8, the composite blade according to the present invention provides direct metal-to-metal contact, eliminating abrasion of the composite laminate 16 and providing metal-to-metal structural rigidity of the assembly.

Figure 3:
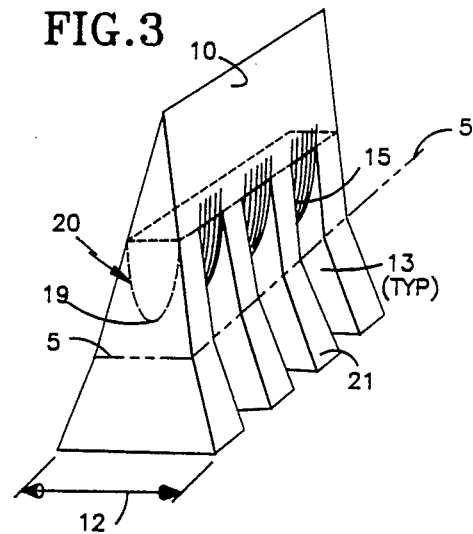
FIGS. 3 and 4 are detailed views of the composite rotor blade, illustrating alternative embodiments of the arrangement of the sub-surface recesses within the blade's internally-located spar.

A second embodiment, shown in FIG. 3, utilizes recesses 13 which are chordwise disposed and originate on the spar's surfaces 10 as shown above, but with the internal surfaces 15 of said recesses 13 converging and communicating at sub-surface locations above the blade base plane 5.

Figure 4:
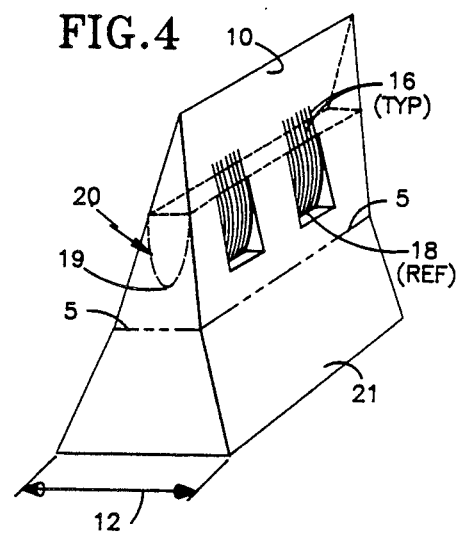

A third embodiment, as shown in FIG. 4, utilizes the same concept as shown in FIG. 3, but unlike that second embodiment, retains the spar material which is immediately located in a radially inward direction below the slot 18 in the spar's surface, said spar material spanwise extending inwardly to the base of the spar root 12. As in the other disclosed embodiments, slot or hole 18 must be sized to allow full containment of the composite laminate 16 below the outer surfaces of the spar root 12.

A fourth embodiment, not shown, provides a chordwise-alternating combination of recesses 13 and slots 18, wherein a first radially inward position below the blade base plane is located next to a first radially inward position above the blade base plane at a chordwise extreme location, the first radially inward position followed by a plurality of alternating radially inward positions above and below the blade base plane, terminating with a final radially inward position above the blade base plane at the chordwisely corresponding opposite extreme location. This configuration allows for the greatest possible chordwise distribution of composite laminate 16.

Additional embodiments utilize combinations of the concepts presented above in terms of placement of recesses 13 or slots 18 in alternating or staggered fashion above or below the blade base plane 5.

In the event of partial or total detachment of the composite laminate 16 from the spar 8, the spar 8 will be retained by the hub 14, thus preserving operation of the rotary machine. This is because the metallic spar 8 provides a significant portion of a composite blade's weight and inertial characteristics, and detachment of some or all of the blade's composite material will not result in the drastic imbalancing which could occur in prior art propulsion systems.

Further modifications and improvements of the invention herein disclosed will occur to those skilled in the respective arts and all such modifications and improvements are deemed to be within the scope of the invention as defined by the appended claims.

I claim:

1. A composite blade including a spar and a composite material, the spar having a root section and a radially outward extending surface, the composite material being layered on the radially outward extending surface and forming an airfoil surface, the root section installable in a recess in a rotor hub, the root section mateable with a complementary shaped hub recess, wherein the root section is located radially inward of a blade base plane, said plane being tangent to the outer diameter of the rotor hub and passing through the hub recess, and wherein the spar includes a spar recess originating and extending from the root section toward the radially outward extending surface, and wherein the composite material is wrapped in a spanwise fashion in relation to the airfoil along the radially outward extending surface of the spar and about the spar root and captured within the spar recess.

2. A composite blade as claimed in claim 1, wherein the spar consists of high-modulus material.

3. A composite blade as claimed in claim 1, wherein the spar recesses are sized to fully accommodate the volumetric bulk of the composite material wrapped therein.

4. A composite blade as claimed in claim 1, wherein only the spar root makes direct contact with the hub recess.

5. A composite blade as claimed in claim 1, wherein the spar root is in the shape of a dovetail.

6. A composite blade as claimed in claim 1, wherein the spar root is in the shape of a fir tree.

7. The composite blade of claim 1, wherein the composite material includes a plurality of high strength filaments embedded in a resinous binder.

8. The composite blade of claim 7, wherein the embedded filaments are directionally oriented.

9. A composite blade as claimed in claim 1, wherein one spar recess is radially outward of the blade base plane.

10. A composite blade as claimed in claim 1, wherein one spar recess is radially inward of the blade base plane.

11. A composite blade as claimed in claim 1, wherein one spar recess is radially outward of the blade base plane and one spar recess is radially inward of the blade base plane.

12. A composite blade as claimed in claim 11, wherein a plurality of said spar recesses chordwisely alternate radially inward and outward relative to the blade base plane and wherein two of the plurality of spar recesses located at the chordwise extreme positions of said spar are disposed radially inward of the blade base plane.

13. A method for constructing a composite blade by wrapping composite laminate around a shaped spar, said spar having a root section installable in a recess in a rotor hub, the root section mateable with a complementary shaped hub recess, comprising the following steps:

(a) laying composite laminate fibers along radially-outward extending sides of a spar above a blade base plane tangent to the outer diameter of the rotor hub passing through the hub's complementary shaped recess, (b) continuing the laying of the composite laminate fibers along the spar sides, radially inwardly directed toward the spar root, (c) continuing the laying of the composite laminate fibers through a plurality of chordwise-distributed recesses in the spar root, and (d) continuing the laying of composite laminate fibers along a reverse radially outward extending side of the spar.

* * * * *